US008662464B2

(12) United States Patent  (10) Patent No.: US 8,662,464 B2
Hand et al.  (45) Date of Patent: *Mar. 4, 2014

(54) ADJUSTABLE, RETRACTABLE CEILING AND WALL HANGING SYSTEM

(76) Inventors: James Arthur Hand, Lee's Summit, MO (US); Sheryl Elaine Hand, Lee's Summit, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/199,647

(22) Filed: Sep. 6, 2011

(65) Prior Publication Data
US 2012/0074276 A1   Mar. 29, 2012

Related U.S. Application Data

(60) Provisional application No. 61/402,827, filed on Sep. 7, 2010, provisional application No. 61/516,056, filed on Mar. 29, 2011.

(51) Int. Cl.
*A47H 1/10* (2006.01)
(52) U.S. Cl.
USPC ...... 248/329; 248/317; 248/309.1; 242/379.2
(58) Field of Classification Search
USPC .......... 248/330.1, 302, 303, 304, 309.1, 317, 248/322, 327, 329, 339; 242/379.2, 380; 224/162
See application file for complete search history.

(56) References Cited

U.S. PATENT DOCUMENTS

| | | | | |
|---|---|---|---|---|
| 5,580,021 A * | 12/1996 | Gillanders | ................. | 248/330.1 |
| 5,954,288 A * | 9/1999 | Shih | .............................. | 242/380 |
| 6,634,610 B1 * | 10/2003 | Ricci et al. | ................. | 248/330.1 |
| 7,464,893 B2 * | 12/2008 | Spjut | .......................... | 242/385.4 |
| 8,191,815 B2 * | 6/2012 | Huang | .......................... | 242/379 |
| 8,446,279 B2 * | 5/2013 | Jennings, III | ............. | 340/568.1 |
| 2010/0148028 A1 * | 6/2010 | Hand et al. | ................. | 248/330.1 |
| 2010/0206976 A1 * | 8/2010 | Salentine et al. | .......... | 242/379.2 |
| 2010/0243783 A1 * | 9/2010 | Hermann, II | ................. | 242/377 |

* cited by examiner

*Primary Examiner* — Todd M Epps
(74) *Attorney, Agent, or Firm* — Mashburn Law Office, LLC; Donna Denise Mashburn

(57) ABSTRACT

An adjustable, retractable hanging system. The hanger, housing a spring-loaded reel and a retractable cable, is attached to a ceiling or exposed ductwork by either opposing flanges or bonding material that is located on the hanger's flat exterior housing wall. A cup, lined with a flexible gasket and having a fin-like appendage on its surface, holds the hanger and is also attached to a pole. The cup and pole assembly attaches the hanger to a ceiling or exposed ductwork without the use of a ladder or any elevating device. After the hanger is attached, the cup's fin-like appendage is used to engages the clip on the cable, allowing the user to lower the clip to within reach. An adjustable cable-stop, which is also attached to the cable, allows the user to adjust the suspended height of the material to be hung.

2 Claims, 6 Drawing Sheets

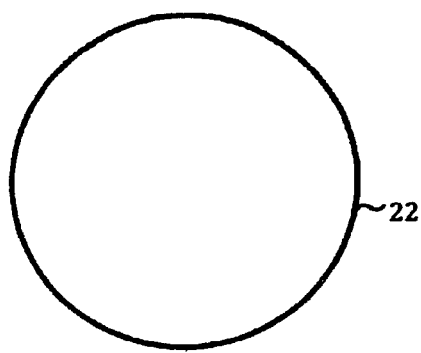
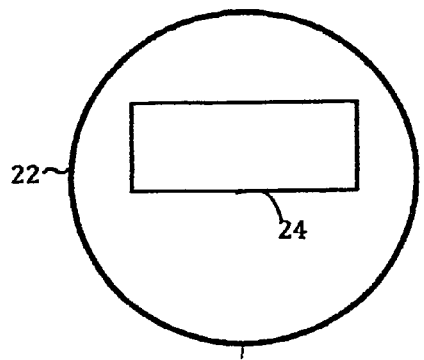
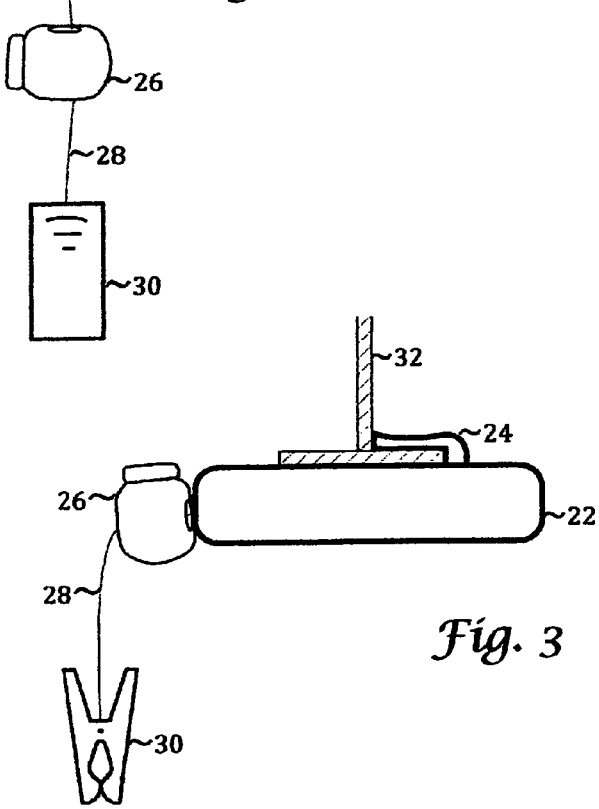

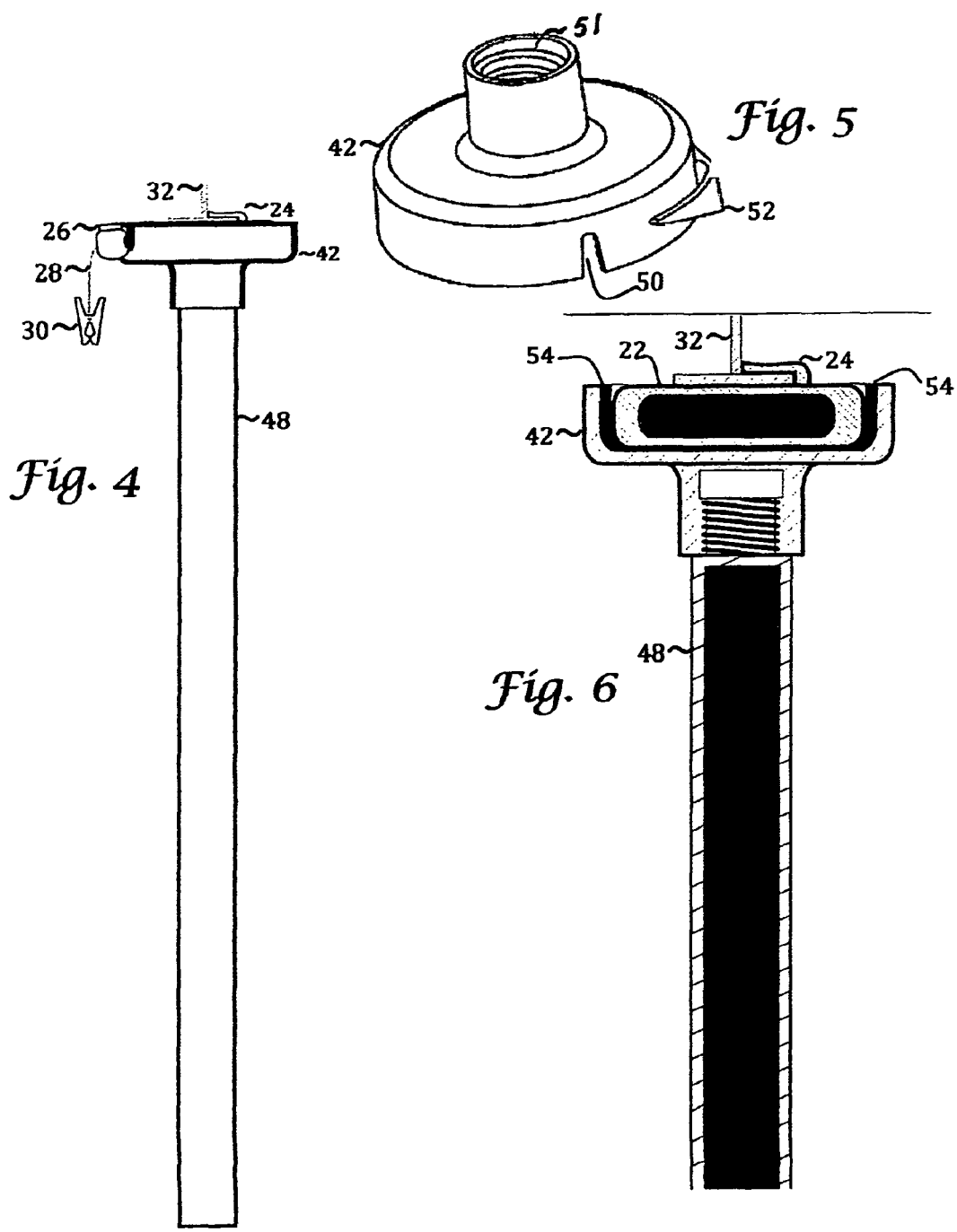

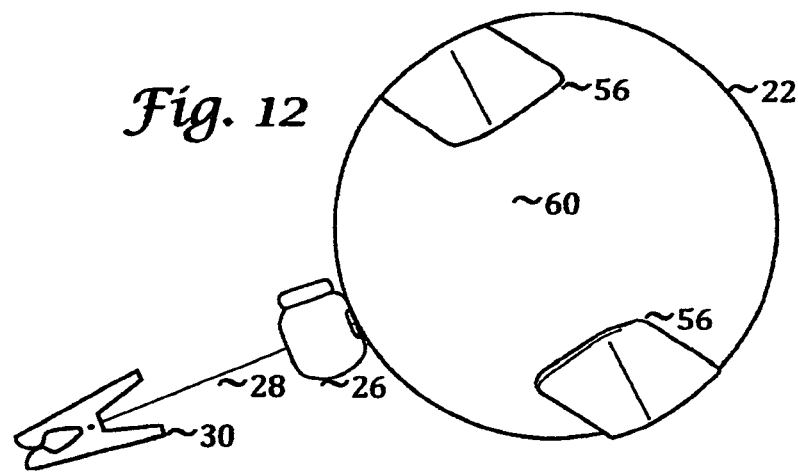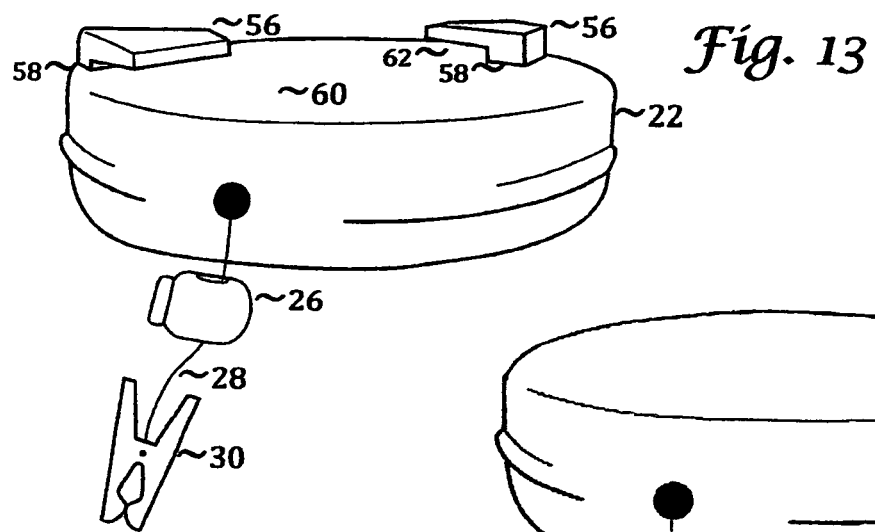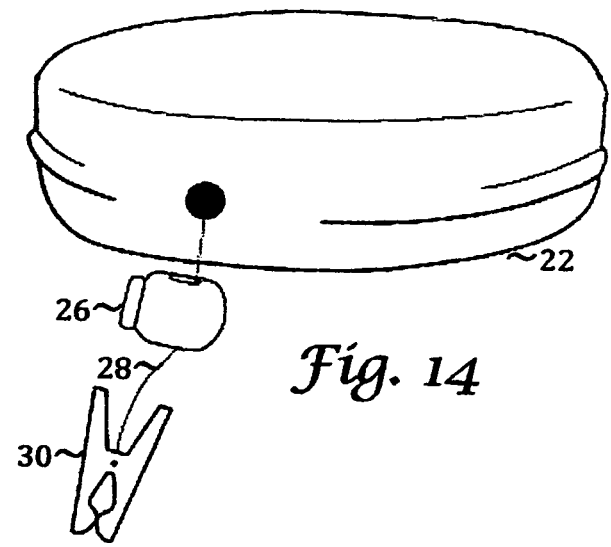

ADJUSTABLE, RETRACTABLE CEILING AND WALL HANGING SYSTEM

CROSS-REFERENCE TO RELATED APPLICATIONS

This application claims the benefit of the filing date of U.S. Non-Provisional patent application Ser. No. 12/592,412, filed Nov. 24, 2009 and U.S. Provisional Patent Application Ser. No. 61/402,827, filed Sep. 7, 2010; and U.S. Provisional Patent Application Ser. No. 61/516,056, filed Mar. 29, 2011, which are incorporated herein by reference.

References Cited

US Patent Documents

| | | |
|---|---|---|
| U.S. Pat. No. 4,112,550 | Sep. 12, 1978 | DeWitt, et al. |
| U.S. Pat. No. 4,135,692 | Jan. 23, 1979 | Ferguson |
| U.S. Pat. No. 4,187,996 | Feb. 12, 1980 | Erlich |
| U.S. Pat. No. 4,323,215 | Apr. 6, 1982 | Berger |
| U.S. Pat. No. 4,556,184 | Dec. 3, 1985 | O'Sullivan |
| U.S. Pat. No. 4,77,623 | Sep. 27, 1988 | Nabinger |
| U.S. Pat. No. 5,052,733 | Oct. 1, 1991 | Cheung, et al. |
| US D321,639 | Nov. 19, 1991 | Adams |
| U.S. Pat. No. 5,247,725 | Sep. 28, 1993 | Vaughn, Jr. |
| U.S. Pat. No. 5,490,651 | Feb. 13, 1996 | Kump |
| U.S. Pat. No. 5,499,789 | Mar. 19, 1996 | Rose |
| U.S. Pat. No. 5,553,905 | Sep. 10, 1996 | Bentivegna |
| U.S. Pat. No. 5,632,519 | May 27, 1997 | Stock |
| U.S. Pat. No. 5,833,165 | Nov. 10, 1998 | Paugh |
| U.S. Pat. No. 5,870,845 | Feb. 16, 1999 | Ruderman, et al. |
| U.S. Pat. No. 6,036,153 | Mar. 14, 2000 | Rose, et al. |
| U.S. Pat. No. 6,073,875 | Jun. 13, 2000 | Paugh |
| U.S. Pat. No. 6,293,601 | Sep. 25, 2001 | Johnson |
| U.S. Pat. No. 6,859,146 B2 | Feb. 22, 2005 | McGreal et al. |
| U.S. Pat. No. 6,634,610 | Oct. 21, 2003 | Ricci, et al. |
| US D497,086 | Oct. 12, 2004 | Lopes |
| U.S. Pat. No. 6,976,662 | Dec. 20, 2005 | Kump et al. |
| U.S. Pat. No. 5,065,971 | Nov. 19, 1991 | Gaube |
| U.S. Pat. No. 6,419,175 B1 | Jul. 16, 2002 | Rankin, VI |
| U.S. Pat. No. 6,557,285 B2 | May 6, 2003 | Walsh, Jr. |
| US 2007/01070333 A1 | Jul. 26, 2007 | Moreno |
| U.S. Pat. No. 7,354,304 B2 | Apr. 8, 2008 | Livingston |
| U.S. Pat. No. 7,380,357 B2 | Jun. 3, 2008 | Jones, et al. |
| US D580,747 | Nov. 18, 2008 | Pollak, et al. |
| U.S. Pat. No. 7,530,519 B2 | May 12, 2009 | McDuff, et al. |
| U.S. Pat. No. 7,610,706 | Nov. 3, 2009 | Pitcher, et al. |

BACKGROUND OF THE INVENTION

1. Field of the Invention

The art relates to hanging devices and ceiling clips for ceilings, primarily suspended ceilings, with specific application, but not limitation, to classroom use.

Pertinent prior ceiling clips or hanging systems related to the invention can be found in U.S. Patent Class 248, sub-classes 317, 323, 328, 329, and 330.1; additionally; U.S. Patent Class 40, subclass 601 and 617; additionally, U.S. Patent Class 242, subclass 385.

2. Description of the Prior Art

Many buildings around the world are fitted with suspended ceilings, which are constructed of inverted "T-shaped" members that cross one another creating a rectangular grid on which lighting, venting, and ceiling panels are positioned. This adjustable, retractable hanging system was conceived for use upon such ceilings, although its utility is not limited to same.

This invention was conceived to address specific needs of teachers, but has wide application for use, especially wherever suspended ceilings are installed. Presently, teachers or other individuals who wish to hang student work or embellish a ceiling with decoration or signage must use hanging devices that require ladders. In a school environment, given the difficulty accessing and utilizing ladders, teachers often stand on desks to reach ceiling t-bars, other ceiling constructions, or high points on walls, an action too often resulting in injury to teachers or students. Risk managers of school districts report that "non-ladder" falls, specifically related to teachers standing on desks, remain a significant source of injury to teachers. However, while this invention, at its inception, was geared to the classroom environment, it has utility in numerous applications outside the classroom. For example, in a work environment, perhaps there is sufficient room to employ the use of a ladder. However, ladders themselves pose a risk, as many individuals, even those who use ladders as a regular part of their working experience, sustain falls. This invention will prevent such injuries.

Existing hangers that are intended for lightweight use do not always offer mounting apparatuses that preclude ladder use, do not reliably provide for easy movement or removal of the hanger, do not offer ease in reaching the mounted hanger, and offer little or no flexibility in changing the height of the item to be hung. While some heavyweight hangers have been patented that allow access from standing height, they are generally devised to suspend weighty signage in commercial settings. As such, they are massive, heavy, expensive, difficult to move, and cannot be affixed to the ceiling without the use of a ladder. Moreover, no patented or commercial hanging apparatuses or systems address the dual problems of making both ceilings and high walls accessible for the teacher or other individuals without the use of a ladder.

Ceiling hangers of many types are currently marketed, but no previous embodiment offers a dynamic system that presents both ease of installation without the use of ladders, flexibility of placement and removal, retractable linkage, and applicability to both ceiling and wall. To illustrate, U.S. Pat. No. 4,112,550 employs a partially flexible ceiling bar attachment mechanism intended for suspended ceilings, from which extends a hook. Opposing flanges grip the sides of the t-bar to position it in place. U.S. Pat. No. 4,323,215 presents a ceiling bar attachment with fixed opposing flanges that when pivoted against the t-bar, grasp both sides to form opposing points of contact. U.S. Pat. No. D321,639 offers a clipping mechanism, also intended for suspended ceilings, that uses sliding opposing flanges for clasping the edges of a ceiling rail. Likewise, U.S. Pat. No. 6,036,153 presents a clipping mechanism intended for use in suspended ceilings whose design allows for multiple linkages in a chaining fashion from the original point of attachment. Each of the above cited hangers is deficient since each requires ladders for installation, lacks ease of ceiling attachment or removal, lacks ease in attaching materials to be suspended, lacks ease in adjustability in suspension height of the material to be hung, and lacks utility in wall applications.

Other prior art, while offering a system to assist in hanging items without ladder assistance, offers neither the simplicity of operation, the retractable cabling, or the adjustability in suspension depth required for low-ceilinged interior application. For example, U.S. Pat. Nos. 5,490,651; 6,976,662 B2, and D580,747, each an improvement upon previously cited art, offer ceiling hook systems which allow for snap-fitted or interlocking ceiling clips that grasp the ceiling bars, and which also employ poles that pressure fit the ceiling hooks to the suspended ceiling members. These hooking apparatuses are deficient, however, in that the hooks are fixed to the ceiling, making attachment and removal of items to be hung difficult. Moreover, both hangers and poles are deficient in that they cannot be used for wall applications. Further, each of the above cited art cannot in themselves provide the user variability in the hanging height of the items.

Also related, U.S. Pat. No. 5,870,845 offers a retractable device housed within a crossbar configuration that allows a user to raise or lower signage from a floor standing position, thereby allowing flexibility in height adjustment. Additionally, U.S. Pat. No. 6,634,610 offers a bar-type hanging device with a take-up reel. However, these inventions, due to their mass, are clearly intended for heavy industrial or commercial use since they require ceiling heights well in excess of the typical 8-9 feet within a classroom. Furthermore, the complicated structures of these systems cause them to be cost-prohibitive for applications identified here. Moreover, while these inventions employ a tool for raising or lowering the signage, they do not offer a tool for mounting and removing the original hanger from the ceiling. Thus, ladders must be used in their initial application. Additionally, these devices have no adaptability to wall use.

Of possible relevance, prior art involving simple take-up reels exists, three of which are seen in U.S. Pat. Nos. 5,833,165 and 6,073,875, and 7,380,357 B2. Though these patents employ retracting reels, given that these reels were intended for use at pocket height for badge or key application, the reels are deficient in that they do not have the stop-mechanism employed as in this embodiment and do not readily attach to walls or ceilings in that neither offers either the ceiling clip, adhesive or magnetic mount offered in this system or the cup and pole assembly. Consequently, they are not effective for use on both ceilings or walls. U.S. Pat. No. 4,773,623, a take-up reel devised to reduce the loss of tool parts unique to a work situation, does not easily attach to a ceiling or wall, and does not offer a line stop of any sort. U.S. Pat. Nos. 4,556,184 and 5,065,971 devices intended for plant hanging, offers a take-up reel construction with latching similar to that used on window shades. This art, intended to suspend heavy plants, relies on a winding take-up reel and locking mechanism that would not be practical in classroom applications. Also, this device cannot be affixed to a ceiling without the use of a ladder, is not adaptable to wall applications, and does not offer mobility of placement.

Other retractors intended may have relevance. U.S. Pat. No. 7,610,706, a device intended for ceiling applications, employs a take-up reel construction with latching similar to that used on dog leashes with extending and retracting mechanisms. It does affix to ceiling cross-members on suspended ceilings wherein the acoustical tiles lie on the same plane as the t-bar; however, its mounting apparatus does not have applicability to suspended ceilings where the t-bar is inverted from the plane of the acoustical tiles. Additionally, as this art is not part of an articulated system, it does not provide a means by which the user can easily affix or remove the hanger from the ceiling or wall without the use of a ladder. U.S. Pat. No. 6,419,175 B1, a simple take-up reel that pivots to reduce the friction involved in extending the cable, offers neither a means by which it might be attached to ceiling or wall, or a means by which the retraction force might be halted before the cable is fully withdraw into the retractor. U.S. Pat. No. 7,354,304 B2 is a simple device that offers a retractable cord for securing electronic devices to prevent damage. Additionally, U.S. Pat. Nos. 4,187,996, 2007/0170333 A1, and U.S. Pat. No. 7,530,519 B2 offer retracting devices, but must be permanently mounted to ceilings. These devices are deficient in that they do not easily attach to ceiling or wall, they require a ladder for application, and since they are permanently mounted, they are impractical for occasional signage use.

Of interest to the inventors was the development of a cable stopping mechanism that would allow the user of the hanging system the ability to adjust the hanging height simply and efficiently. Previously mentioned reels in U.S. Pat. Nos. 5,833,165 and 6,073,875 offer no adjustable stopping mechanism. In these applications, the cable stops only when fully retracted. Likewise, U.S. Pat. No. 6,557,285 B2, a sign hanger, utilizes a retractor, but cannot be easily mounted to ceilings without the use of a ladder or chair, and does not employ a line stop.

Prior art found in U.S. Pat. No. 5,870,845 utilizes a motorized system to halt the cable, a system both too expensive and impractical for lightweight use. U.S. Pat. No. 6,634,610 offers a cable stopping mechanism that encases the cable and is tightened or opened with a thumbscrew. U.S. Pat. No. 7,610,706 employs an internal stopping mechanism that is controllable from the exterior of the hanger with a finger switch that responds to pressure. This art is deficient in that the stopping mechanism must be engaged at the hanger, making it awkward for the user to execute from a standing position on the floor. Users of U.S. Pat. No. 7,610,706 must remove the hanger from the ceiling to engage or release the stopping mechanism, creating one more step in its execution, making it less efficient, especially since this art does not provide a system by which the hanger can be easily applied to or removed from the ceiling. Additionally, the attachment mechanism in U.S. Pat. No. 7,610,706 is not practical for wall application, making no provisions for same. None of the prior art offers the simplicity of action as that offered by the cable-stop in the embodiment.

Of additional interest may be prior art addressing hanging systems for walls. U.S. Pat. No. 6,591,528 B2 details a suspension device that employs pulleys to lift banners. This device lacks the applicability to both wall and ceiling, employs no retractors or cable-stop, and must utilize a ladder to affix it to a wall.

The superiority of the hanger, the installation cup, and this system, then, is enhanced by the ease by which the hanger can be attached, moved, and removed from the walls or ceilings on which the hanger is used, all without the use of a ladder. When attached to the telescoping pole, the specialized cup holds the ceiling hanger and assists in affixing the hanger to the ceiling or the wall, while the user installing the assembly remains at floor level. Within the cup is a flexible gasket that temporarily stabilizes the hanger within the cup as it is lifted to the ceiling or wall by use of the pole. Projecting from the exterior of the cup is a fin shaped appendage that is used to grasp the art clip which dangles from the hanger, lower it to within easy reach, and facilitate attachment of the material to be hung. (Art clips can take many forms. Here, a simple spring mechanism is illustrated.)

Prior art offers poles or pole assemblies that are associated with hanging devices, that raise and lower the hanging apparatus, but which fall short of the design utility of the cup and pole assembly within this system. Poles previously noted in U.S. Pat. Nos. 5,490,651; 6,976,662 B2; and D580,747 are examples of such. These pole assemblies just assist in mounting the hanger, but do not raise and lower the hanging apparatus to within the user's reach. Similarly, U.S. Pat. No. 5,247,725, is applies a scissor-type action on a pole assembly to compress clips for applications to ceilings, but cannot assist in bringing hangers within reach. Discussed in U.S. Pat. Nos. 5,870,845 and 6,634,610 assist in drawing the hangers within easy reach, but do not assist in mounting or removing the hangers from the ceiling.

Of further interest may be prior art that utilizes an application system that lofts items to a ceiling and twists to engage their placement. U.S. Pat. No. 6,859,146 employs a mounting system with a flexible arm similar to this system, however, the component parts assist in lofting and refitting smoke detector and as such do not address the needs of hanging signage in a simple or efficient manner. Likewise, U.S. Pat. No. 7,287,738 B2 offers a means by which items may be attached to a ceiling by lofting a supporting device by means of a pole, which is then coupled to a base attached to the ceiling. However, the base attachment that receives the device to be mounted must be secured to the ceiling by means of screws, and conceivably, utilizing a ladder. Since the base is fixidly secured, there is little flexibility of movement that this system affords.

Clearly, while some pole assemblies may be used to apply or remove the hangers and some will assist in bringing the hanger within arm's reach, none can do all of the above, and none of the prior hanging devices are adaptable to wall applications.

Of possible interest is other prior art related to just poles. U.S. Pat. No. 5,632,519 reveals a levered pole for hanging objects. U.S. Pat. No. 6,293,601 utilizes a telescoping pole with a simple hook assembly. Other poles of possible relevance can be found in U.S. Pat. Nos. D497,086; 5,553,905; 5,052,733 and 4,135,692. These pole assemblies are deficient in that they do not have adaptations that (a) lower the hooking apparatus to within typical standing reach, (b) easily move the hanger to new locations, (c) easily provide for the hanger's removal, and (d) attach the hanger to both the ceiling and wall.

BRIEF SUMMARY OF THE INVENTION

In accordance with the various embodiments, a unique hanger with several embodiments, a unique application cup, and a hanging system which employs these parts is designed to prevent ladder and non-ladder falls by providing articulated parts that together create a system by which items can be easily inexpensively, safely, and securely mounted and removed from both ceiling and wall.

Accordingly, several advantages of one or more aspects exist in this system and its component parts. The first is a hanger that employs optional backings. The second is a cup, which when attached to a pole assists in affixing the hanger to the ceiling or wall, pulling the cable and art clip to within easy grasp, and removing the hanger. A third is an adjustable arm that lends maneuverability to the pole and cup assemblage. A fourth is a pole that attaches to the specialized cup or adjustable arm. A fifth is a wall rail.

The hanger contains a reel and retractable cable withdrawn by a constant pull steel spring. Since a variety of acoustical tiles exist in the marketplace, various embodiments for the back of the hanger are presented here. The various embodiments meet the needs of both acoustical tiles that lie on the same plane with the t-bar, and those that extend below the t-bar, in relationship to the floor. For easy reference, the four alternative backings will be referred to as the pressure-clip embodiment, the opposing flanges embodiment, and the rectangular-platformed embodiment, and the flat-backed embodiment.

It is envisioned that the outer case of the hanger be constructed of a polycarbonate material, available in a variety of colors, although other varieties of plastics or other materials, such as various metals, may also be suitable. The inventors envision this hanger as being round, a simple design to match the internal reel, although it could take other shapes as long as the operation of the internal reel is unimpeded. In every embodiment, within the hanger is found a retractable wheel or reel, in tension with spring steel, and a cable that winds internally about the wheel, and extends externally from the hanger. Both a cable-stop and a clipping mechanism are attached to the external portion of the cable.

The pressure-clip embodiment of the hanger is the first embodiment discussed. In the first embodiment, the hanger is fitted with a pressure-clip that has been specifically engineered to attach the hanger to the suspended ceiling. This embodiment efficiently attaches to suspended ceilings that present a planar surface whereby both the inverted t-bars (hereafter referred to as t-bars) and the acoustical tiles are on the same plane.

In this first embodiment, the pressure-clip is constructed to exert constant, flexible pressure on the inverted t-bar member once affixed. The clip extends from the back of the hanger, and turns to lie parallel to the back of the hanger. When affixed to the inverted t-bar, the hanger lies parallel to the ceiling, beneath the face of the t-bar. The clip affixes to the t-bar in a sliding motion, approaching the edge of the t-bar, and enveloping the both faces of the t-bar as it is pulled to mount it. This mounting action is facilitated by the cup and pole. This embodiment is suitable for suspended ceilings whose acoustical tiles present in the same plane as the t-bars. This embodiment is also suitable for the wall rail, another functional piece of the hanging system explained in an alternative embodiment.

To enhance the safety of the first embodiment in its ability to secure closely to the t-bar, the pressure-clip is specially formed to meet the profile of the face of the t-bar to which it will attach. T-bars are constructed of metal that is bent on its edges to present a smooth face to the room. This bending action creates a raised lip on the back of the t-bar face. In this embodiment, the pressure-clip conforms to this uneven surface, and by conforming, creates greater tension upon the t-bar, and greater security in its resting state.

In an alternative application, this pressure-clip backed hanger is secured to the wall by means of a wall rail. The advantage of this dual application is readily apparent, in that the hanger now has flexibility of use on both ceiling and wall.

In an alternative embodiment, the opposing flanges embodiment, the back of the hanger is fitted with opposing flanges that align with the sides of the t-bar, and when pivoted against the t-bar, grasp and hold it securely. When raised to the t-bar, this embodiment is rotated to pivot on its axis to grasp the t-bar in a locking fashion. The opposing flanges grasp opposite sides of the t-bar, exerting pressure on both the left and right sides and both the upper and lower faces of the exposed portion of the t-bar. This embodiment, like that of the first, is also suitable for suspended ceilings whose acoustical tiles present on the same plane as the t-bars.

In yet another alternative embodiment, the rectangular-platformed embodiment, the back of the hanger is fashioned with a protruding rectangular platform on which adhesive or magnetic attachments can be positioned. Some suspended ceilings have t-bars that are recessed from the plane of the acoustical ceiling panels. In these suspended ceilings, the acoustical panels extend below the t-bar, in relationship to the floor, creating a channel, making the pressure-clip or opposing flange embodiments unsuitable. This embodiment with a raised platform efficiently attaches to suspended ceilings with such a channeled t-bar, by use of magnet, interlocking tape-backed products, or adhesive. Additionally, since this hanger can attach with by a variety of means, it also has utility in buildings that may not have a suspended ceiling, but may be either finished with drywall or plaster ceilings, or show exposed ductwork in an open-ceiling concept.

The system provides for another embodiment that offers a simple flat surface to which adhesives, interlocking tape-backed products, or magnets might be applied. In this embodiment, the back of the hanger is free of appendages, allowing a wide surface for contact with the ceiling. This embodiment, due to the wider surface area, forms a more aggressive bond, enhancing the utility of the hanger on normal plastered ceilings or exposed beams or ductwork.

The cable extending through an opening in the hanger to the exterior of the hanger is threaded through a cable-stop, illustrated here as a ball with an external tab release, which contains an internal spring that exerts pressure on the cable. The cable-stop is easily moved along the cable by exerting pressure upon the external tab, releasing the internal spring. When the cable-stop is engaged, or stopped along the cable, it gives sufficient pressure to the cable to prevent it from being fully withdrawn into the hanger. This feature allows the user to determine the distance at which the item to be hung will suspend from the ceiling.

The placement of the cable-stop in relation to the hanger offers an added advantage, as it is secured directly above the art clip. Since the features of this invention allow the art clip to be drawn within easy arm's reach, the cable-stop is also easily engaged and easily adjusted to meet the needs of the user.

Facilitating the application and removal of the hanger to the ceiling are the specialized cup, into which the hanger fits, and the pole, onto which the specialized cup is threadably attached.

The cup is notched to allow the cable, cable-stop and art clip to extend outside the walls of the cup.

The cup is lined with a flexible gasket that exerts sufficient pressure on the hanger to keep it secured within the cup for both ceiling (horizontal) and wall (vertical) applications.

Extending from the exterior wall of the cup is a fin-like appendage that is used to hook the art clip for the purposes of withdrawing it from ceiling height to standing height.

Rotating the pole in a position just below the affixed hanger, the appendage engages the art clip or the ring on the cable, and allows the user to pull the art clip to within arms' reach.

An additional unique part of this hanging system is the wall rail. Installed near the ceiling line on the walls of the classroom or other facilities, it now ensures complete safety in hanging items about the room. In this embodiment, the rail consists of a single construction that bends in two places to allow room for mounting the pressure-clip backed hanger in a vertical position. The base of the rail is mounted flush to the wall and secured to the wall by screws or adhesive. To meet the needs of wall applications, a pole attachment in the form of an adjustable arm. This adjustable arm has an interlocking mechanism that allows the user to change the angle of the cup in relationship to the pole, which will allow the user to better meet the vertical plane of the wall. Various designs exist for such adjustable arms. One such adjustable arm is depicted herein, but other designs would be acceptable as long as said design offered flexibility adjusting angles of attachment between the cup and pole. This pole attachment is fundamental for wall use since different angles of approach should be taken when attaching the hanger to the wall rail.

Additionally, the system utilizes the use of a pole, mentioned here as an extension pole, but makes no specific design claims, as various acceptable poles exist in the marketplace. The inventors envision the use of an extension pole that locks and unlocks when its parts are rotated against one another. Poles can be constructed of a variety of lightweight metals or woods, but plastics may in the future be acceptable.

As important to the invention as its ease of attachment to the ceiling or wall is the ease by which it is moved or removed. A simple reversal of the hanging action removes the hanger from wall or ceiling, allowing the user flexibility in use, again, notably, without ever having to leave the safety of a floor position.

This illustrates a hanger with various embodiments, an installation cup, and a hanging system designed to prevent ladder and non-ladder falls by providing articulated parts that together create an assemblage by which items can be easily, inexpensively, safely, and securely mounted and removed from both ceiling and wall.

BRIEF DESCRIPTION OF THE DRAWINGS

Figures

Referring now to the drawings in which like reference numbers represent corresponding parts throughout:

FIG. 1 is a schematic of one embodiment of the hanger on a vertical plane, with the cable slightly extended to reveal the cable-stop. The retractable cable and spring-loaded reel is understood to be within the hanger. An art clip, seen here with a front view, is attached to the end of the cable.

FIG. 2 illustrates the pressure-clip hanger reversed from FIG. 1, to reveal the pressure-clip when viewed on the vertical plane.

FIG. 3 illustrates a side view of the pressure-clip hanger, now on a horizontal plane and mounted to the t-bar of a suspended ceiling member. The pressure-clip is visibly attached to the t-bar.

FIG. 4 illustrates the pressure-clip hanger still within the cup after the pressure-clip hanger has been attached to the t-bar. Also visible are the cup and pole assembly.

FIG. 5 reveals the exterior of the cup, a coupling point for attachment to a pole, notched side, and fin-like appendage.

FIG. 6 illustrates a cutaway view of the pressure-clip hanger within the cup and attached to the t-bar. Also visible is the gasket that exerts pressure upon the hanger, securing it within the cup, ready for attachment to ceiling or wall.

FIG. 12 illustrates the alternative backing identified by opposing flanges. The first view illustrates the view of the hanger back before engaged with the t-bar. Both opposing flanges are visible. The void between the flanges gives space for the t-bar. When rotated on the t-bar, the flanges engage the sides of the t-bar, locking the hanger in place.

FIG. 13 illustrates the alternative embodiment of the hanger with opposing flanges revealing the space beneath the flanges. The crevice is ramped to exert pressure on the t-bar when fully mounted.

FIG. 14 illustrates the alternative embodiment of the hanger with a completely flat back that allows a large surface to be mounted to ceilings, open ductwork, or exposed beams.

Figure 7:
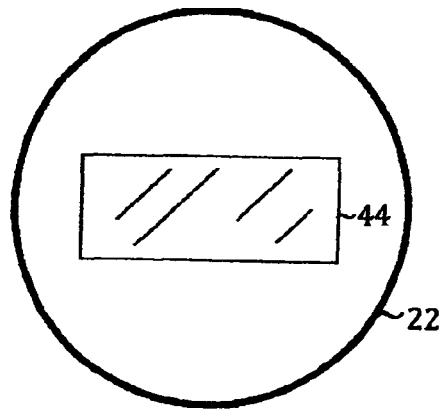
FIG. 7 reveals the alternative embodiment of the hanger, which is fitted with a protruding rectangular-platform. Some acoustical tiles in suspended ceilings protrude beyond the t-bar, creating a channeled t-bar, one that is recessed from the plane of the acoustical tiles. In this alternative embodiment, the protruding rectangular platform meets the recessed t-bar efficiently, providing a platform to which a magnet or adhesive may be adhered.

REFERENCE NUMERALS 22 hanger
24 pressure-clip
26 cable-stop
28 cable
30 art clip
32 t-bar
34 rail
36 mounting screws
38 wall
40 ceiling
42 cup
44 rectangular platform
46 adjustable arm
48 pole
50 cable slot
51 coupling point for pole
52 fm appendage
54 flexible gasket
56 opposing flanges
58 connection
60 platform
62 void

DETAILED DESCRIPTION OF THE DRAWINGS

In the following description of the embodiment, reference is made to the accompanying drawings, which illustrate embodiments by which the invention may be practiced. We recognize that other embodiments may be utilized and structural changes may be made without departing from the scope of the present invention.

First Embodiment—FIG. 1. Illustrates hanger 22, shown here on a vertical plane. In the hanger is housed the retractable reel for the cable 28. In this embodiment we envision the exterior of hanger 22 to be comprised of two halves composed of polycarbonate material, which halves may be welded together sonically. This material offers flexibility of choice in color and texture, and when welded forms a virtually indestructible bond. However, other materials may prove to be more acceptable such as differing plastic composites, metals, or other synthetics.

Though not shown on this image, but understood to exist, within the housing lies the take-up reel, often of a polymer, upon which is wound a stainless steel constant-force metal spring which gives sufficient force to effectively retract the cable for light signage. Also in FIG. 1, the cable 28 is partially extended to reveal the moveable cable-stop 26. We envision the cable to be constructed of a multi-stranded polyester for strength and durability. Other known or yet to be conceived man-made fibers may prove to be more cost effective and durable. The cable retraction can be halted by the cable-stop 26, illustrated here as a ball with tab and internal spring action, which when engaged, adds tension to the cable 28. We imagine this cable-stop to be composed of plastic, metal, or a composite, with a spring within it. The cable passes through the cable-stop 26. The internal spring within the cable-stop 26 causes sufficient friction between the cable-stop 26 and the cable 28 so as to assist in halting the retracting action of the retractable reel. The cable-stop 26 can be easily manipulated to move to any spot along the cable where the user wishes to halt the action of the retractable reel within the hanger 22. Also visible from this view is the art clip 30, which is affixed to the end of the cable 28.

Embodiment—FIG. 2. Moving to FIG. 2, there is presented a reverse illustration of FIG. 1, whereby the pressure-clip 24 on the back of the hanger 22 is revealed.

Depending upon manufacturing constraints, this pressure-clip 24 will be either molded as part of the back of the hanger 22 housing, or it will be affixed to the hanger 22 assembly. The pressure-clip 24 is engineered to snugly fit the t-bar 32 and wall rail 34, so as to safely secure it in place.

Embodiment—FIG. 3. Examining FIG. 3, the hanger 22, now on a horizontal plane, can be seen attached to the t-bar 32; the side view of the pressure-clip is clearly visible. The pressure-clip 24 on the back of the hanger 22 fits securely on the t-bar 32, withstanding the, pressure that will be placed upon it when the cable 28 is extended or retracts. In this view, the cable-stop 26 has halted the retracting reel within the hanger 22, and the cable 28 extends some distance from the t-bar 32.

Embodiment—FIG. 4. This drawing illustrates the pole 48 and cup 42 assembly. The cup 42 is attached to the upper end of the pole 48. In this view the cup 42 is in position to assist in attaching the hanger 22 to the t-bar 32. When employing the pole 48 assembly, the user simply lifts the cup 42 containing the hanger 22 to the suspended ceiling, slides the hanger 22 onto the t-bar, and removes the pole 48. When retracting the art clip 30 to within arm's reach, the pole 48 and cup 42 assembly hover just below the attached hanger and are then rotated slightly. This rotation allows the fin-like appendage 52 to grasp the art clip 30 and pull it to within reach.

Also revealed in FIG. 4 is the cable slot 50 in the cup 42, which allows the cable 28, cable-stop 26, and art clip 30 to be placed outside the cup 42 while installing the hanger 22 to the t-bar 32 or wall rail 34.

Embodiment—FIG. 5 reveals the exterior of the cup 42, showing a clearer view of the cable slot 50, the coupling point for the pole 51, and fin appendage 52.

Embodiment—FIG. 6 reveals a cutaway view of FIG. 4, revealing the hanger 22 within the cup 42. Also visible is the connection between cup and pole. While the connection illustrated here reveals a threaded coupling, it is conceivable that other connections could be configured without departure from the present scope of the invention. Also revealed here is the flexible gasket 54, which exerts constant flexible pressure upon the hanger 22 while it is positioned in the cup 42.

Operation—First Embodiment—FIGS. 1-6

In the first embodiment, when the hanger 22 is placed in the installation cup 42 with the pressure clip 24 exposed, ready to be placed upon the ceiling 40. The cup 42, is attached to the pole 48 by means of a coupling point 51, shown here as a threaded contact. The cup, containing the hanger 22, is raised to the ceiling 40. The pressure clip 24 is aligned with the side of the t-bar 32, and with a pulling motion, the pressure clip 24 on the hanger 22 slides onto the t-bar 32, resting securely.

The pole 48 and cup 42 are now lowered slightly to disengage the hanger 22 from the cup 42.

The cup 42 is now rotated in a clockwise manner, allowing the fin appendage 52 to engage the art clip 30. The pole 48 is now lowered, having engaged the art clip 30, cable 28, and cable-stop 26, bringing the art clip 30 to within hands' height. At this point the user may attach art or signage to the art clip 30, and, later lofting the pole 48 back to the t-bar 32, allow the cable 28 to be retracted within the hanger 22, and the art or signage retracted to the ceiling 40.

If the user wishes that the art be only partially retracted to the ceiling 40, the user may now engage the cable stop 26, and by depressing the spring mechanism within the cable stop 26, release pressure on the cable, allowing it to move it to the desired place on the cable. As the cable is retracted within the hanger 22 the cable stop 26 halts the retraction of the internal reel.

Now the pole 48 can be lifted back to the ceiling 40, allowing the cable 28 to be retracted within the hanger 22. The art or signage now hangs at the desired height. The cup 42 and its fm appendage 52 are now disengaged from the art clip 30, and the application pole 48 and cup 42 are removed.

Figure 8:
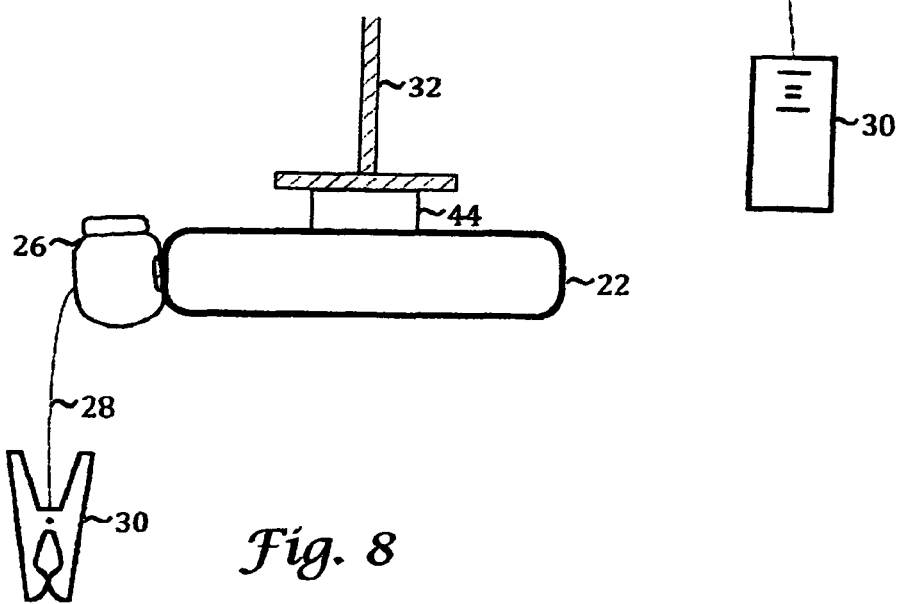
FIG. 8 illustrates a horizontal view of the rectangular-platformed backing. In this view the hanger is shown attached to the t-bar by adhesive or magnet.

Description—Alternative Embodiment—FIGS. 7 and 8

FIG. 7 illustrates a horizontal view of an alternative embodiment of hanger 22, that with the rectangular platform 44. Here the rectangular platform 44 can be seen attached to the face of the t-bar 32. The rectangular platform 44, now covered with either magnet or adhesive, attaches hanger 22 to t-bar 32. In this alternative embodiment, the rectangular platform 44 that protrudes from the back of the hanger 22, is precisely engineered to allow the hanger applicability to ceilings with acoustical panels that extend beyond and below the t-bar cross members.

FIG. 8 illustrates the hanger 22, now on a vertical plane, with the rectangular platform 44 exposed.

Operation—Alternative Embodiment—FIG. 7 and FIG. 8

In this alternative embodiment, as before, the hanger 22 is placed in the installation cup 42, this time with the rectangular platform 44 exposed, ready to be placed upon t-bar 32 or some other surface of the ceiling 40. (For example, some ceilings are open, presenting ductwork to which this alternative embodiment may be attached.) The cup 42, now attached to the pole 48 and containing the hanger 22, is raised to the ceiling 40. The rectangular platform 44 is positioned on either the face of the t-bar 32 or some other surface, and pressure is exerted, securing the hanger 22 to the mounting surface. The cup 42 is then removed from the hanger 22, and in motions identical to that of the first embodiment, the art clip 30 is engaged and the hanger 22 is utilized.

Figure 9:
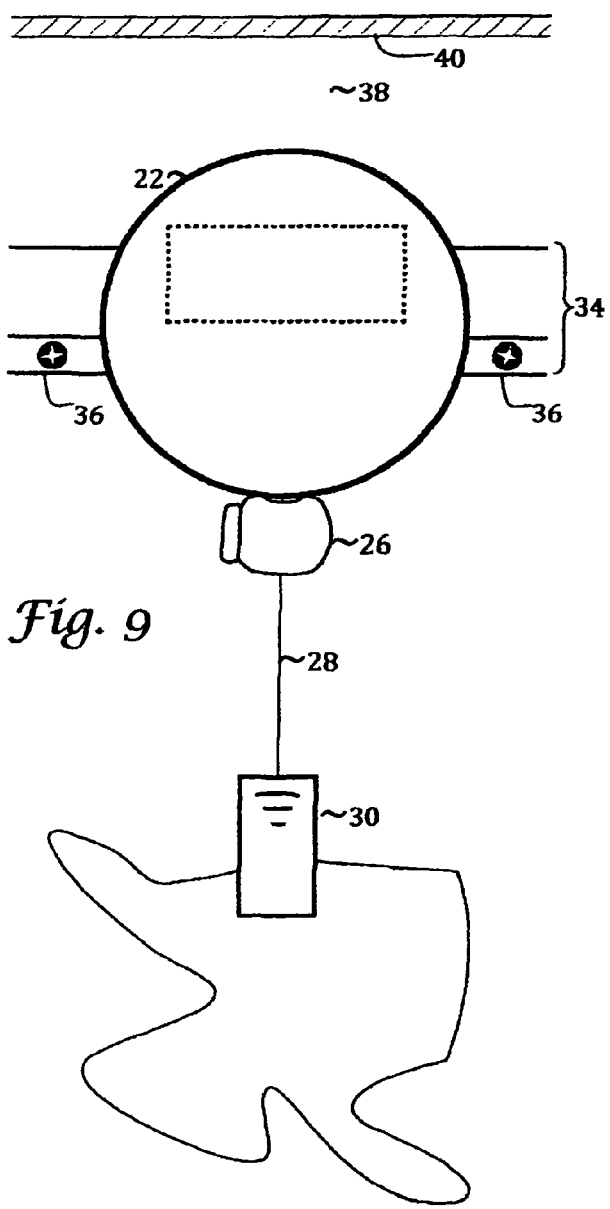
FIG. 9 reveals the pressure-clip embodiment now attached vertically to the wall rail, which is mounted on a wall.
Figure 10:
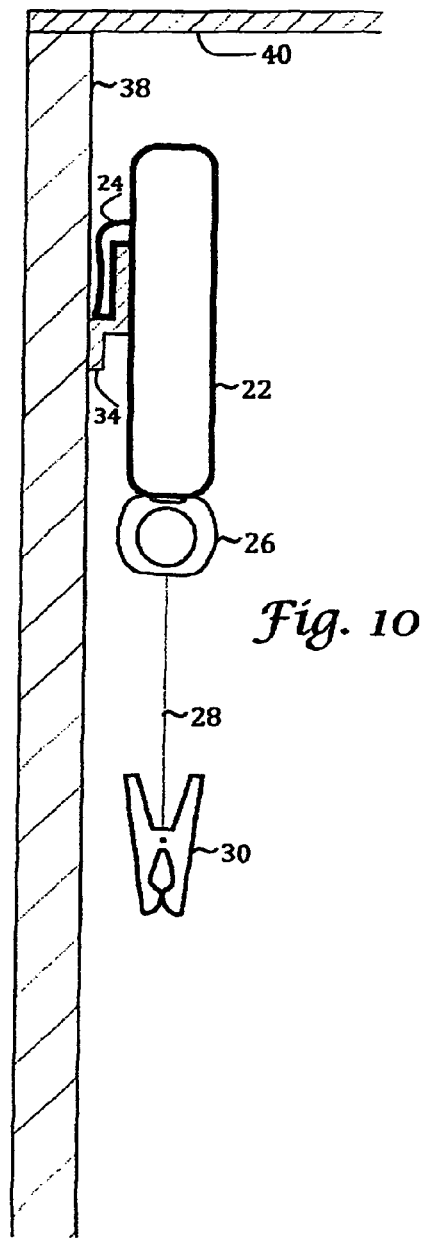
FIG. 10 reveals a side view of the pressure-clip hanger that has been installed on the wall rail. The wall rail, attached to the wall, bends perpendicularly away from the wall, turning another 90 degrees to create a vertical rail. Doing so, a void results in which the pressure-clip can rest. The pressure-clip fits on the upper extension of the wall rail just as it fits on the t-bar. The pressure-clip exerts sufficient pressure to stabilize the hanger and hold it in place.
Figure 11:
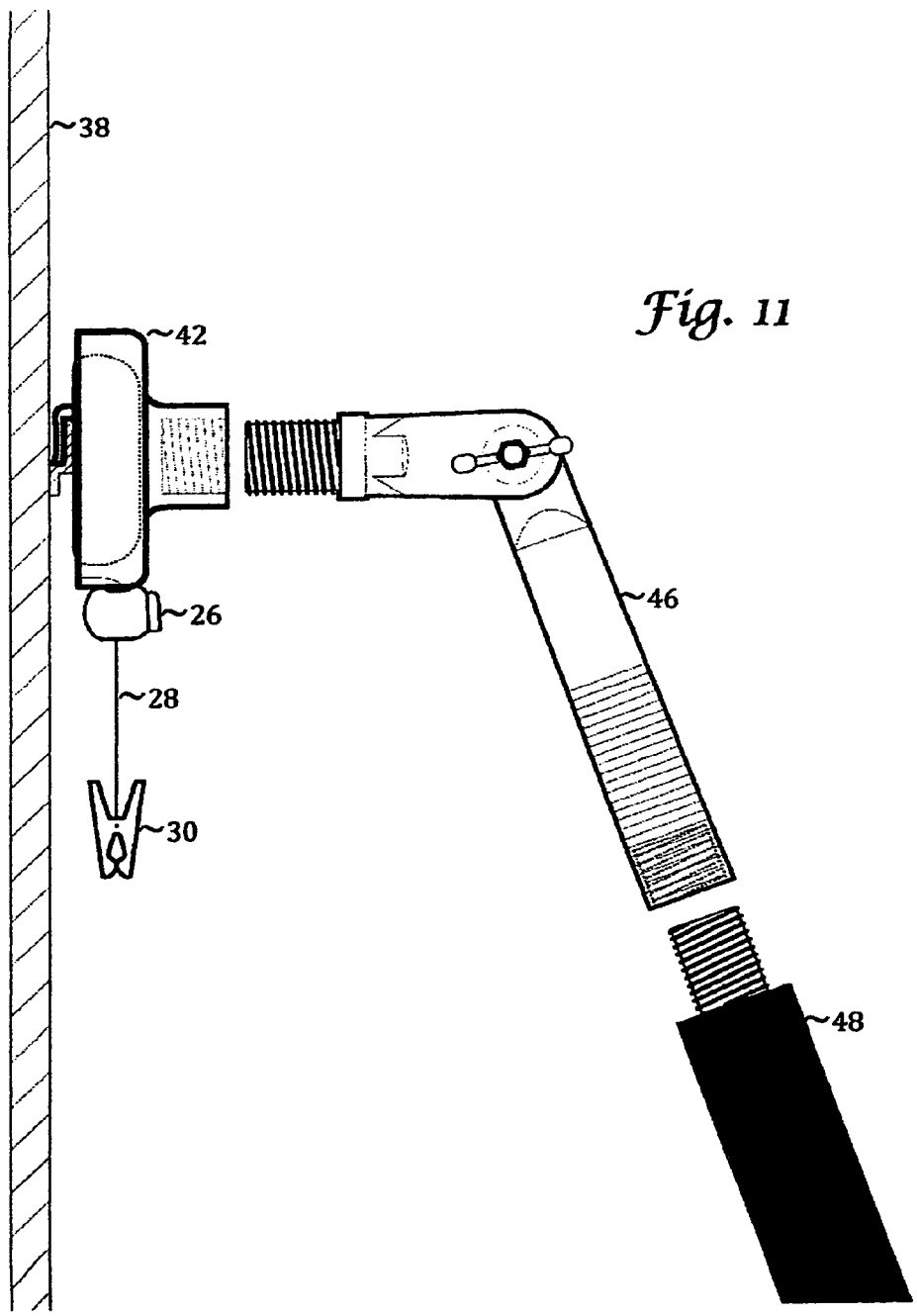
FIG. 11 illustrates the pressure-clip hanger within the specialized cup, attached to the wall rail. The flexible arm, shown here threadably coupled to both the cup and the pole, is bent to accommodate a comfortable position for mounting the hanger to the wall. The adjustable arm allows an angular adjustment to be made from that viewed in FIG. 4.

Description—Alternative Embodiment—FIGS. 9, 10 and 11

FIG. 9 shows hanger 22, on a vertical plane, now fitted with the pressure-clip 24 of the first embodiment, affixed to the wall rail 34. The wall rail 34 is mounted on the wall 38 near the ceiling 40. Here the cable-stop 26 has halted the retractable cable 28 some distance from the art clip 30. The art clip 30 within this illustration is shown holding an item. Here also, the mounting screws 36 can be clearly seen as they are in place to secure the wall rail 34 to the wall 38. However, the wall rail is designed to adapt to installations where it would be preferable to mount it with adhesive or tape. The functional shape of the wall rail may be changed without departing from the scope of the invention.

It is envisioned that the rail 34 be constructed of a resilient polypropylene or polycarbonate material, but it could conceivably be constructed of metal or other materials without limiting the scope of the invention.

FIG. 10 reveals a cutaway wall and side-view of the hanger 22 as it is mounted to the wall rail 34, which is affixed to a wall 38. As seen in FIG. 9, The cable 28 is slightly extended and the retracting action within the hanger 22 is stopped by the cable-stop 26. The wall rail 34 extends sufficiently away from wall 38 and ceiling 40 to allow it to receive the pressure-clip 24 and secure the hanger 22.

FIG. 11 shows the cup 42 attaching the hanger 22 to the wall rail 34, which is affixed to a wall 38. The flexible gasket 54 has assisted to hold the hanger 22 securely within the cup 42 as it approaches the wall 38. The adjustable arm 46 beneath the cup has been angled to comfortably mount the hanger 22 with the pressure-clip 24 to the wall rail 34. Here the articulated parts are illustrated linked with a threaded coupling, but other connections could be configured without departure from the present invention.

Operation—Alternative Embodiment—FIGS. 9, 10, and 11

Hanger 22 is placed in the installation cup 42 with the pressure clip 24 exposed, ready to be placed upon the wall rail 34. The user then simply lofts the pole and cup assembly to align the pressure clip 24 with the wall rail 34, and with a downward motion, attached the hanger 22 to the wall rail 34. The cup 42 is then removed from the hanger 22, and in motions identical to that of the first embodiment, the art clip 30 is engaged and the hanger 22 is utilized.

Description—Alternative Embodiment—FIGS. 12 and 13

FIG. 12 illustrates hanger 22 with the alternative opposing-flanged embodiment. Here opposing flanges 56 located on the outer rim of the back of hanger 22 are in position to receive t-bar 32. The flanges 56 are pictured here as parallelograms, but could be slightly changed in shape without departing from the spirit of the embodiment.

FIG. 13, illustrating a side view of the opposing-flanged embodiment of hanger 22 reveals voids beneath the flanges 56. The flanges 56 make a connection 58 to hanger 22, as a molded part of the backing. Extending from that connection 58, they form a platform 60, under which a void 62 is created. This void 62 is constructed ramp, being narrower at the point of connection 58, growing wider at the open end of the flange 56, where it opens to receive the t-bar 32. This gradual decline in space beneath the flange 56 exerts increasing pressure on the t-bar 32 when the hanger 22 is rotated onto the t-bar 6 and attached.

Operation—Alternative Embodiment—FIGS. 12 and 13

In this alternative embodiment, as before, the hanger 22 is placed in the installation cup 42, this time with the opposing flanges 56 exposed, ready to be placed upon t-bar 32. The cup 42, now attached to the pole 48 and containing the hanger 22, is raised to the ceiling 40. The opposing flanges 56 are positioned to straddle the edges oft-bar 32, and the installation cup 42 is rotated to secure the hanger 22 to the t-bar 32. The cup 42 is then removed from the hanger 22, and in motions identical to that of the first embodiment, the art clip 30 is engaged and the hanger 22 is utilized.

Description—Alternative Embodiment—FIG. 14

FIG. 14 illustrates hanger 22 with the alternative flat-backed embodiment. Here a flat surface presents, creating a larger surface area for adhesive attachment to a ceiling or exposed ductwork.

Operation—Alternative Embodiment—FIG. 14

In this alternative embodiment, as before, the hanger 22 is placed in the installation cup 42, this time with the entire face of the hanger 22 exposed, ready to be placed upon t-bar 32. The cup 42, now attached to the pole 48 and containing the hanger 22, is raised to the ceiling 40. Adhesive attached to the face of hanger 22 is pressed upon the ceiling surface to which it is to be mounted. The cup 42 is then removed from the hanger 22, and in motions identical to that of the first embodiment, the art clip 30 is engaged and the hanger 22 is utilized.

CONCLUSIONS, RAMIFICATIONS, AND SCOPE

While the above description contains many specificities, these should not be construed as limitations on the scope, but as exemplifications of the presently preferred embodiments thereof. Many other ramifications and variations are possible within the teachings. For example, materials may be altered in the construction of the hanger. Additionally, the shape of hanger, cable-stop, pressure clip, mounting platforms may be changed to accommodate changes of ceilings.

Additionally, simple changes to the shape of the wall rail may be needed to improve upon its efficiency either in reliably holding the hanger or in ease of application. For example, the rail may employ a simple U-shape rather than that described. Additionally, given that the retraction force needed to withdraw an article is relative to the weight of the object being retracted, the recoil of the force may require that a slightly different construction of the rail, perhaps an upper edge to encase the hanger. Therefore, slight modifications of shape may be necessary to improve the reliability and efficiency of the wall rail. Such modifications should not be construed as limitations on the scope of the invention.

Further, other cable-stops may be designed that enhance the functionality of the hanger without detracting from the spirit or scope of the embodiments or without sacrificing all of their material advantages.

Furthermore, a simple pole, one that does not have an internal extending capacity may be employed, and the coupling point, while shown here to be threaded, may require a simple pressure fitting.

Thus, the scope of the various embodiments and aspects should be determined by the appended claims and their legal equivalents and not by the examples given.

What is claimed:

1. A hanging system comprising:
   a pole;
   a hanger that houses a spring-loaded reel and a retractable cable and said retractable cable having an inner end connected to said spring-loaded reel and an outer end extended outside of a hole in said hanger;
   at least one pressure clip on an exterior housing wall of said hanger and said opposing flanges are adapted for attaching, removing, and repositioning the hanger to a T-bar of a suspended ceiling without using a ladder or any elevating device;
   a cup, attached on one end of said pole, that holds said hanger, and the cup having a notch in a side configured for the retractable cable to extend through the notch and pass outside of the cup;
   a flexible gasket lining an interior wall of said cup that exerts pressure on said hanger to secure the hanger inside of the cup;
   an adjustable cable stop and a clip that are juxtaposed and attached to said outer end of said retractable cable that is located outside of said hanger; and
   a fin appendage affixed to an outer surface of said cup, that is used to grasp, lower, and raise said clip, 2. A hanging system comprising:
   a pole;
   a hanger that houses a spring-loaded reel and a retractable cable and said retractable cable having an inner end connected to said spring-loaded reel and an outer end extended outside of a hole in said hanger;
   a flat surface on an exterior housing wall of said hanger with at least one pressure clip on said flat surface for attaching, removing, and repositioning the hanger to a ceiling or exposed ductwork without using a ladder or any elevating device;
   a cup, attached on one end of said pole, that holds said hanger, and the cup having a notch in a side configured for the retractable cable to extend through the notch and pass outside of the cup;
   a flexible gasket lining an interior wall of said cup that exerts pressure on said hanger to secure the hanger inside of the cup;
   an adjustable cable stop and a clip that are juxtaposed and attached to said outer end of said retractable cable that is located outside of said hanger; and
   a fin appendage affixed to an outer surface of said cup, that is used to grasp, lower, and raise said clip.

* * * * *